May 23, 1967  R. E. BOWLES  3,320,815
FLUID-OPERATED ROTATION-SENSING DEVICE
Filed Feb. 6, 1962  7 Sheets-Sheet 1

INVENTOR
ROMALD E. BOWLES

BY S. J. Rotondi, A. J. Dupont
& R. C. Lucke

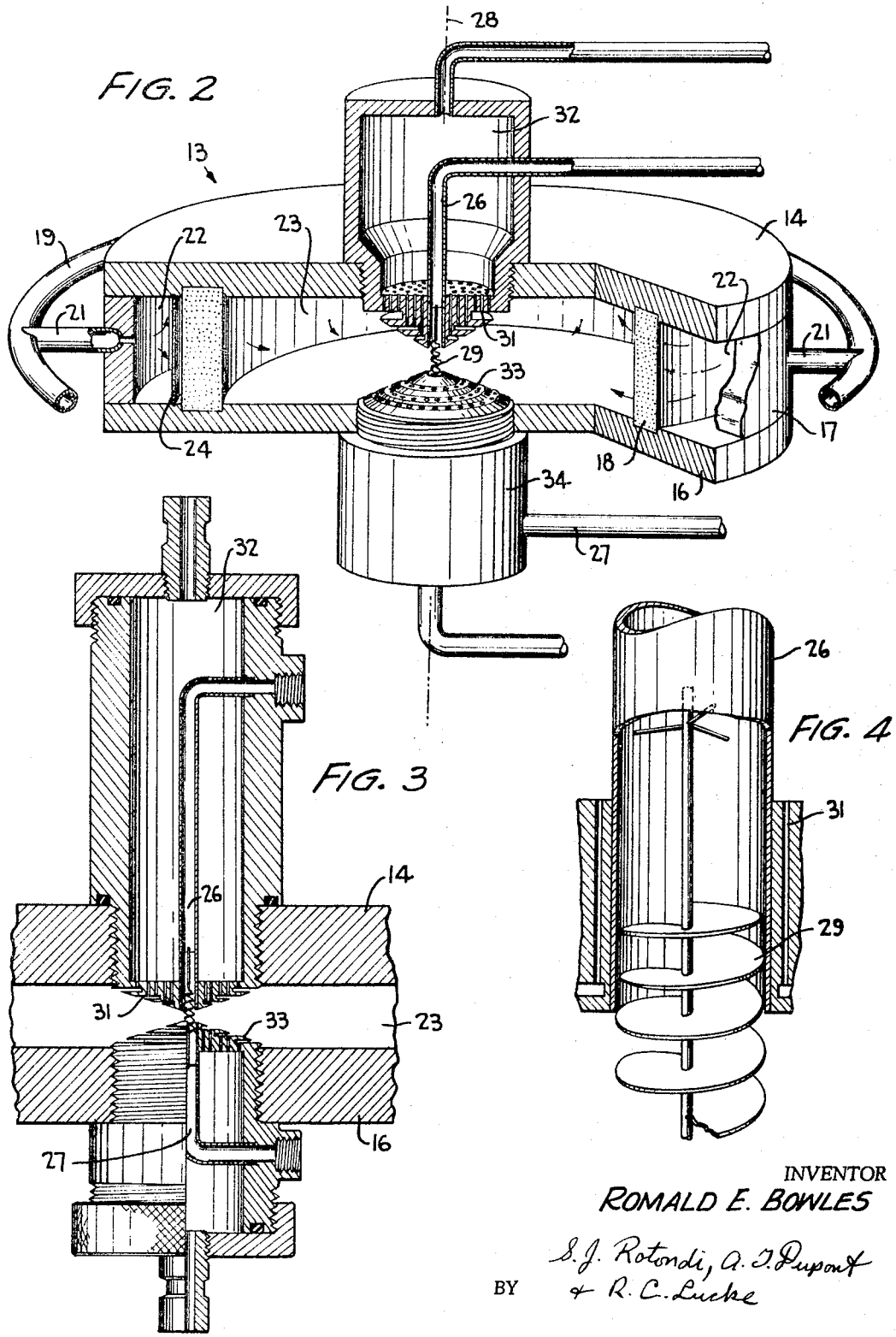

May 23, 1967 R. E. BOWLES 3,320,815
FLUID-OPERATED ROTATION-SENSING DEVICE
Filed Feb. 6, 1962 7 Sheets-Sheet 4

INVENTOR
ROMALD E. BOWLES
BY S.J. Rotondi, A.J. Dupont
& R.C. Lucke

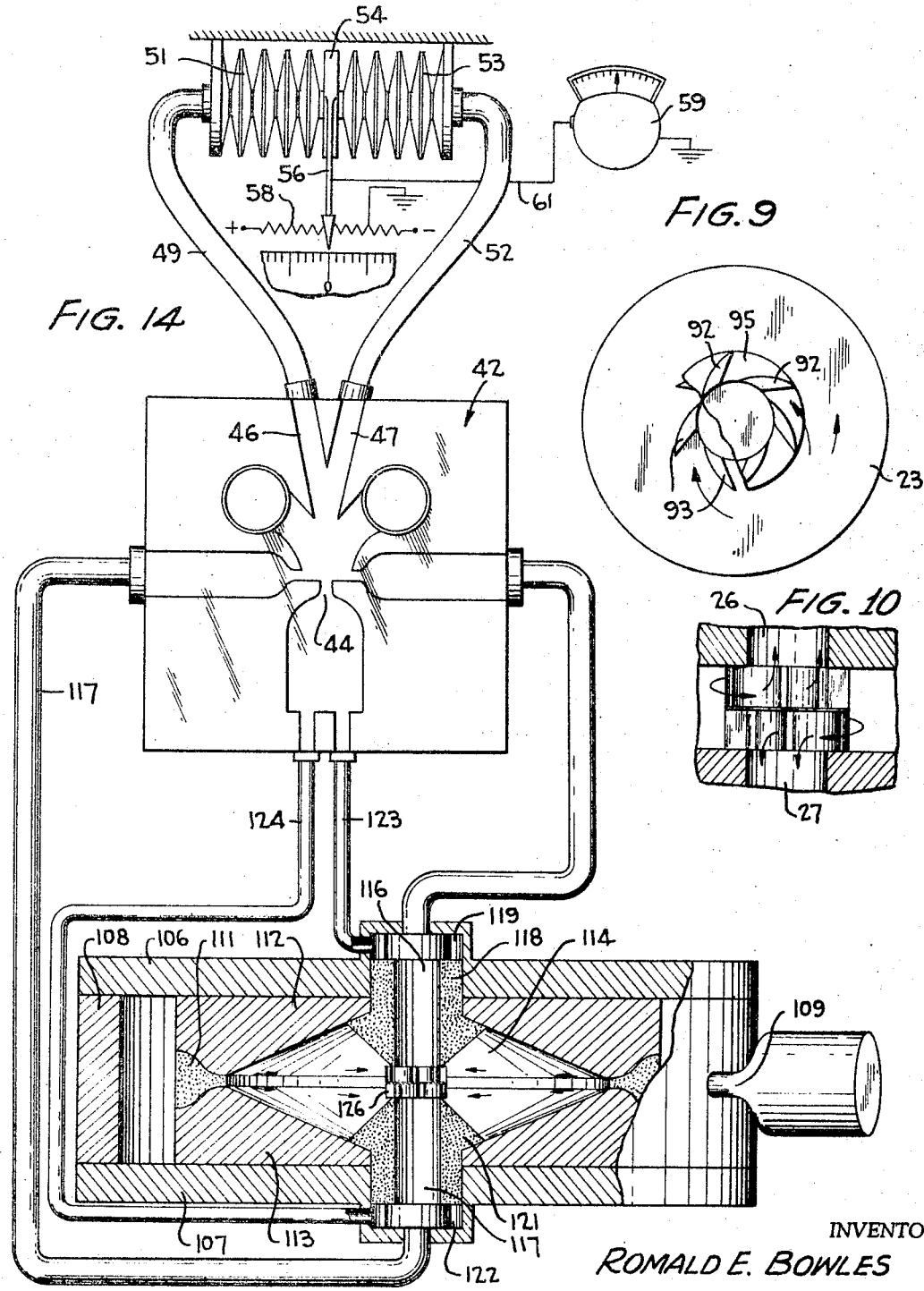

May 23, 1967 R. E. BOWLES 3,320,815
FLUID-OPERATED ROTATION-SENSING DEVICE
Filed Feb. 6, 1962 7 Sheets-Sheet 6

INVENTOR
ROMALD E. BOWLES

BY S. J. Rotondi, A. J. Dupont
& R. C. Lucke

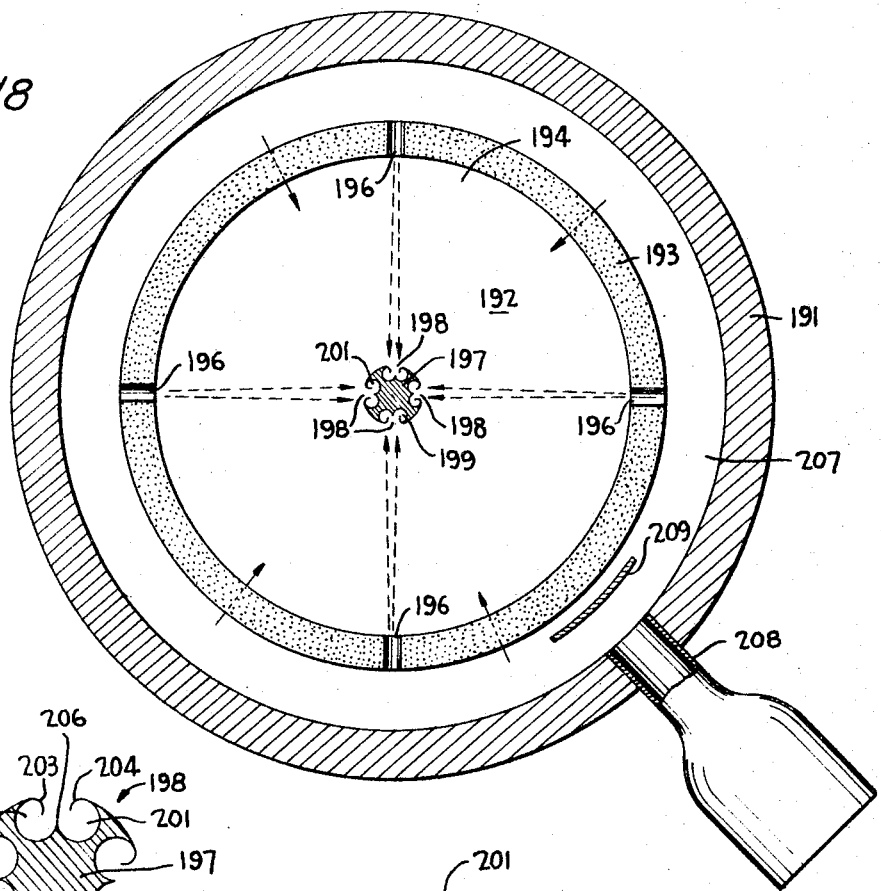
FIG. 18
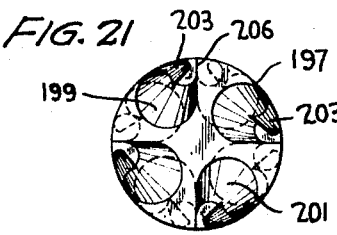
FIG. 20
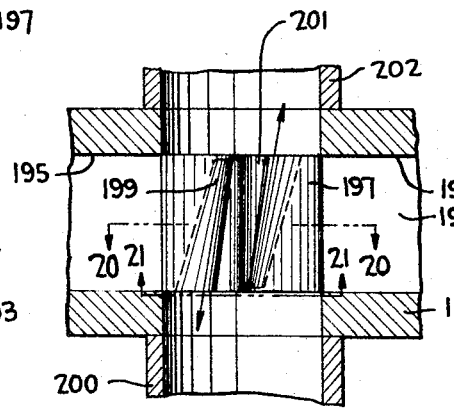
FIG. 21
FIG. 19
INVENTOR
ROMALD E. BOWLES United States Patent Office 3,320,815
Patented May 23, 1967

3,320,815
FLUID-OPERATED ROTATION-SENSING DEVICE
Romald E. Bowles, Silver Spring, Md., assignor to the United States of America as represented by the Secretary of the Army
Filed Feb. 6, 1962, Ser. No. 171,538
27 Claims. (Cl. 73—505)

The invention described herein may be manufactured and used by or for the Government for governmental purposes without the payment to me of any royalty thereon.

The present invention relates to devices for measuring angular rate of rotation and more particularly to an angular rate measuring apparatus employing a fluid vortex amplifier to measure the rate of rotation of a shaft and other mechanism, a missile or other airborne or waterborne device about one or more of its three principal axes.

The fluid vortex amplifier of the general type utilized in the present invention is described in the co-pending application of Romald E. Bowles and Billy M. Horton entitled, "Fluid Amplifier" filed on Aug. 11, 1960, and assigned Ser. No. 49,061, now abandoned; a co-pending continuation of said application Ser. No. 49,061, namely, application Ser. No. 439,500, filed Feb. 23, 1965, has now matured into Patent No. 3,276,259, dated Oct. 4, 1966. The fluid vortex amplifier described in the co-pending application utilizes the flow of fluid, fluid characteristics, and fluid flow characteristics to amplify a fluid input signal. The fluid employed may be a liquid, a gas, a mixture of liquid and gas, or combinations wherein different fluids are employed in different sections of the amplifier. The fluid may include solid particles of limited size, of the same material as the gaseous or liquid fluid, but in solid phase, or of a different material in solid phase.

To understand the operation of a fluid vortex amplifier, consider a circular pan of liquid provided with a small discharge hole at the bottom center. The height of the liquid in the pan results in a hydrostatic pressure tending to force the fluid out of the small centrally located discharge hole. In the case of irrotational flow; that is, completely radial flow as opposed to circumferential flow, the fluid flows radially towards and through the discharge hole. However, if a tangential component of velocity is imparted to an annulus of fluid immediately adjacent to the rim of the pan, this fluid annulus rotates about a vertical line through the discharge hole as a major axis. It has been shown mathematically in numerous textbooks that as this annulus shrinks towards the centrally located hole or outlet, the circumferential velocity component $V_c$ for simple rotational flow of an ideal fluid is related to the radial position of the annulus by the equation (1), $$V_c = \frac{\text{constant}}{R} \quad (1)$$

where R represents the radius of the annulus at a particular time and $V_c$ represents the circumferential velocity component of the fluid at this radial location. It is apparent from the above equation that when the fluid is discharging from the pan through the small centrally located hole, as fluid moves from the rim towards this hole, the circumferential velocity component of the fluid increases as the radial position decreases. Under ideal conditions, if one starts with a ten-inch diameter pan discharging through a centrally located hole of .01 inch diameter, the circumferential velocity component at the discharge hole would be one thousand times the circumferential velocity component at the rim of the pan. Thus, the tangential velocity component is amplified.

While an open pan of liquid has been employed to describe, in elementary fashion, the operation of a vortex amplifier, preferred embodiments of the invention employ a closed container or vortex chamber wherein either liquid or gas or mixtures thereof may be employed as the fluid in the system and where the source of pressure causing the fluid discharge need not be derived from gravitational effects but may be due to initial pressurization of the vortex chamber or to a replenishing flow of fluid or fluids into the vortex chambers at a radius or radii different from the discharge radius.

In accordance with the present invention, an input signal is produced as a result of rotation of a missile, other airborne or waterborne vehicle, or other object movable in space relative to a base reference, about one of its principal axes. For purposes of explanation, reference is made to a missile which normally has three axes of rotation, the yaw, pitch and roll axes. It is a common practice in the control of missiles, aircraft, surface vessels and submarines to employ gyroscopic devices for measuring the rotation of these vehicles about one or more of their aforesaid axes. The roll axis of a vehicle is the axis along its longitudinal center line. The pitch axis is the central axis in the horizontal plane extending perpendicular to the roll axis. The yaw axis of the vehicle is, on the other hand, the vertical axis which perpendicularly intersects the pitch and roll axes. In a known conventional gyroscopic system, three rate gyroscopes may be provided, each having the axis of rotation of the stabilizing or sensing mass aligned with a different one of the three axes of the vehicle. Upon rotation of the vehicle relative to one of these axes, an associated gyroscope is caused to precess and the amplitude and sense of precession of this gyroscope is a function of the rate and direction of rotation of the vehicle relative to the vehicle's axis. A vast quantity of art has been built up concerning systems for utilizing this information for stabilizing the missile along a particular flight path. Normally, these signals are applied to several systems for operating the various control members related with each of these axes so as to control the vehicle rate of rotation or, cooperatively with other components, to return the vehicle to its initial attitude or orientation relative to each of the three axes.

There are two classes of gyroscopic devices in widespread use today, these being orientation and rate gyros. The orientation gyro provides information indicating the actual angular orientation of the vehicle relative to a desired angular orientation and the control mechanism utilizes these signals, usually in a servo loop, to produce counter-rotation of the vehicle until the error signal generated by the gyroscopic device is substantially reduced to zero. In a rate gyroscope, the rate of change of orientation of the vehicle relative to its desired rate of change of orientation is measured. This rate signal may be utilized to control a counter rotational torque of the vehicle so as to balance out the initial rate of rotation and therefore terminate rotation relative to the axis. In most gyroscopic systems employed to date, both orientation and rate signals are generated, it being well known in the servo art that in systems employing both of these signals, substantially stable operation of the apparatus may be obtained. The orientation and rate signals may be provided by distinct gyroscopic devices or an orientation gyroscope may be employed with a circuit having a means for differentiating the position signal and for combining the differentiated signal with the original position signal to provide all of the necessary information. Conversely, a rate gyro may be employed with a circuit providing for integration of the rate signals over predetermined time intervals, the integrated and rate signals being combined to provide a final error signal which may be employed by the apparatus to provide a substantially completely stable control system.

The present invention provides a rate-measuring device for use in control systems of the type described above in which a separate one of these devices may be provided for measuring rate of rotation of a vehicle about each of its three major axes and so provide a control signal for the angular rate of rotation about each of these axes. In another embodiment of the present invention, the apparatus generates only rate signals, and therefore it would be desirable to provide control apparatus for integrating the rate signals so as to obtain a combined rate and orientation signal which, as indicated above, is desirable in such systems. In another embodiment of the present invention, both approximate orientation and rate signals are generated by the apparatus, thereby simplifying the system. The control apparatus may be either electrical, mechanical or pneumatic regardless of the type of rate-measuring device employed.

In any of the prior art gyroscopic systems, it is necessary to provide circuits permitting information relating to a change of course, altitude, attitude, etc., of the vehicle to be inserted. Thus, a circuit may be provided for inserting a signal into the error detecting portion of the system, which signal appears to the system as an error signal and therefore causes the vehicle to be moved in an effort to correct the error. Movement of the vehicle about the desired axis or axes continues so long as the input signal is applied and conversely is discontinued when the signal is removed.

In the apparatus of the present invention, there is provided means for inserting signals into the vortex chamber in the form of fluid jets having a particular tangential velocity and sense which signals are detected at the output as rotational flow of a particular sense and magnitude. These latter signals then appear to the system as any other error signal and cause rotation of the vehicle relative to a particular axis. Rotation of the vehicle continues so long as the input signal is applied and conversely will be discontinued when the input signal is removed.

It is accordingly a broad object of the present invention to provide a rate of rotation measuring device utilizing a fluid vortex amplifier.

It is another object of the present invention to provide a rate measuring device employing a fluid vortex amplifier to which input signals may be applied to alter the attitude of a vehicle relative to the axis aligned with the center line of the rate unit.

It is another object of the present invention to provide a rate and position measuring device employing a fluid vortex amplifier.

It is still another object of the present invention to provide a rate and position measuring device employing a combination of a fluid vortex amplifier and a coriolis effect measuring device.

It is yet another object of the present invention to provide a rate measuring device employing a fluid vortex amplifier in which multiple input signals may be applied at various radii of the unit relative to its center line.

Yet another object of the present invention is to provide a rate measuring device which also provides directly an integral, over a predetermined time, of the rate signal.

The above and still further objects, features and advantages of the present invention will become apparent upon consideration of the following detailed description of several embodiments thereof, especially when taken in conjunction with the accompanying drawings, wherein:

FIGURE 2 is a perspective view of a first embodiment of the rate measuring device of the present invention;

FIGURE 3 is a view partially in section taken along the vertical center line of the apparatus of FIGURE 2;

FIGURE 4 is an enlarged view of the sensing device employed in the apparatus of FIGURE 2;

FIGURES 9 and 10 illustrate still another apparatus for determining direction of rotation of the fluid at the center of the vortex chamber;

FIGURE 14 illustrates a rate measuring device specifically designed for utilization at high altitudes and the connection of this device to a measuring system;

FIGURE 18 is a top view of a vortex unit employing concurrently fluids having low and high velocity radial flows; and FIGURES 19 through 21 illustrate in detail the sensor unit employed in the apparatus of FIGURE 18.

Figure 1:
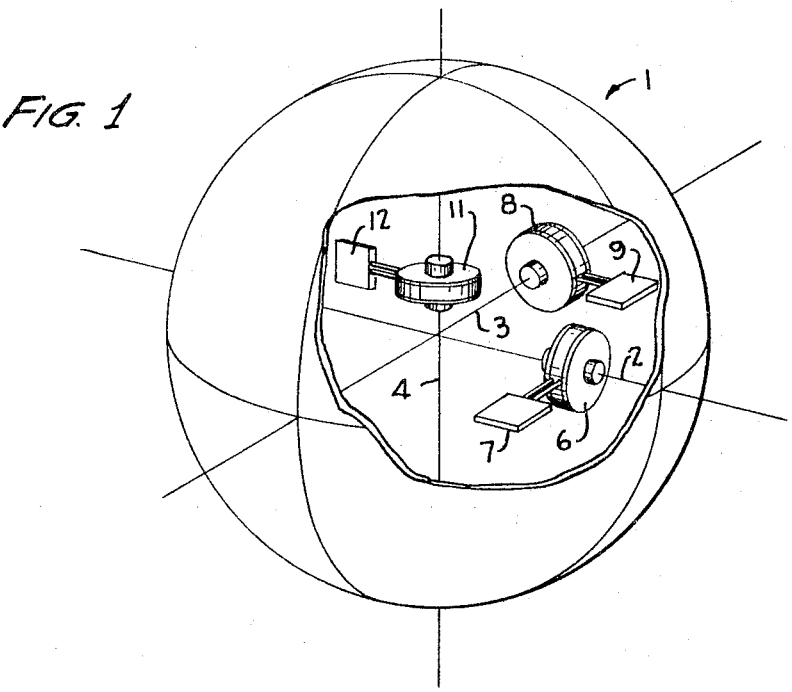
FIGURE 1 is a three-dimensional view illustrating the rate measuring devices positioned on a body such as to measure rate of rotation about its three principal axes.

Referring specifically to FIGURE 1 of the accompanying drawings, there is illustrated, for purposes of explanation, a missile, generally designated by the reference numeral 1, having a roll axis 2, a pitch axis 3 and a yaw axis 4. A rate or rate and position measuring device 6 has its center line disposed along the roll axis 2 and is employed to measure either rate of rotation of the missile 1 about the roll axis 2 or, in the alternative, to measure the position of the missile relative to an arbitrary fixed position about the roll axis and the rate of rotation relative to this axis. Output signals from the unit 6 which are either hydraulic or pneumatic signals may be coupled directly to a roll axis control mechanism 7 employed to control the stability of the missile 1 relative to the roll axis. Similarly, there is provided a rate or rate and position measuring unit 8 employed for measuring rotation of the missile 1 about its pitch axis 3. The unit 8 provides hydraulic or pneumatic control signals to a pitch axis control mechanism 9 which may be employed in conventional manner to control the rotation or position of the missile 1 about the axis 3. A further device 11 of the type provided by the present invention has its center line aligned along the yaw axis 4 of the missile 1 and this unit provides output signals to a yaw axis control mechanism 12 employed to operate controls on the missile to determine its rotation about the yaw axis 4. The mechanisms for effecting actual control of the device 1 whether it is a missile, an airplane, a submarine, or a surface vessel are well known in the art and form no part of the present invention. These systems which include as a part thereof, the elements 7, 9 and 12 of FIGURE 1 may be of any conventional type and may be hydraulic, pneumatic or electric. If the systems are electric, then the elements 7, 9 and 12 of FIGURE 1 must provide for conversion of the fluid signals to electrical signals or, in the alternative, the devices 6, 8 and 11 may provide electrical output signals directly.

Referring now specifically to FIGURE 2 of the accompanying drawings, there is illustrated a rate measuring device as provided by the present invention. The device, which is generally designated by the reference numeral 13, comprises in the position illustrated, a top wall 14, a bottom wall 16 and an annular outer wall 17. Disposed between the top and bottom walls 14 and 16 and inwardly of and concentric with the outer annular wall 17 is a wall 18 preferably fabricated from a porous material although a solid material having a plurality of holes drilled therethrough may be employed. Fluid under pressure is applied to a manifold 19 having a plurality of radially directed pipes 21 which are connected to a chamber 22 defined by the annuli 17 and 18 and the top and bottom walls 14 and 16, respectively. The fluid under pressure in the chamber 22 bleeds through the porous wall 18 and passes into a vortex chamber 23 defined by the top and bottom walls 14 and 16, respectively, and the porous annulus 18. In order to insure uniform pressure throughout the chamber 22 and specifically to eliminate regions of high pressure immediately adjacent the pipes 21, deflectors 24 are provided in the path of the fluid jets issuing from the pipes 21. The deflectors 24 are disposed in the chamber 22 relatively near to the porous wall 18.

The vortex unit 13 is provided with a push-pull arrangement of outlet passages or pipes 26 and 27 which are circular in cross-section and concentric with a center line 28 of the apparatus 13, the elements 14, 16, 17, 18 and 19 all being concentric with the center line 28. An Archimedes screw device 29 extends from the interior of the pipe 26 into the interior of the pipe 27 having a region lying between the pipes and disposed in the chamber 23. The pipe 26 is surrounded in the region of the vortex chamber 23 by a generally triangular member 31 having a plurality of passages which provide communication between the vortex chamber 23 and a further chamber 32 disposed generally above the plate 14. Similarly, the pipe 27 is surrounded by a generally triangular member 33 having a plurality of passages therethrough so as to provide communication between the vortex chamber 23 and a further chamber 34 disposed generally below the plate 16. The apices of the triangular members 31 and 33 are directed toward one another and inwardly of the chamber 23 and are symmetrical about the center line 28 of the device. The members 31 and 33 may be in the form illustrated; that is, having passages actually drilled therethrough or may comprise porous members fabricated basically from the same material as the wall 18.

As previously indicated, the vortical chamber 23 and its associated elements provide an amplifier which presents to the output device a fluid flow constituting an amplified function of an input circumferential flow. The operation of the vortex amplifier is governed by Equation 2

$$V_{td} = \frac{r_i}{r_d} \eta V_{ti} \quad (2)$$

where $r_i$ and $r_d$ are the radial locations of the inlet and discharge devices with respect to the center line of the apparatus, $V_{td}$ is the output circumferential velocity, $V_{ti}$ is the input circumferential velocity and $\eta$ is a nonlinear modification introduced by viscous forces and is equal to "one" in the absence of viscosity. Thus, if the input fluid has a tangential velocity, $V_{ti}$, the tangential velocity of the fluid is presented to the helical device 29 is equal to $V_{td}$ and is an amplified function of $V_{ti}$ governed by the ratio of the radius at the input of the device to the radius of the pipes 26 and 27. It may also be shown that rotational velocities in a vortex amplifier are governed by Equation 3

$$W_d = \left(\frac{r_i}{r_d}\right)^2 K \eta W_i \quad (3)$$

where $W_d$ is the rotational velocity of the output device, $W_i$ is the rotational velocity of the input location, $\eta$ is the viscosity factor and K is a constant approximately equal to "one." It can be seen from Equations 2 and 3 that the device of FIGURE 2 is a multiplier amplifier in which the multiplication factor can be varied as a function of the ratio $r_i/r_d$.

As mentioned above, Equations 2 and 3 contain the factor $\eta$ related to the viscosity of the fluid. In systems of the type illustrated in FIGURE 2, since the fluid is rotating relative to the walls 14 and 16, there is a tendency to retard the rotational velocity of the fluid adjacent the walls due to boundary layer effects at the interfaces between the fluid and the top and bottom walls. Due to the viscosity of the system, the flow of the fluid throughout the system is retarded. In order to minimize the effects of this boundary layer drag of the output signals, the devices 31 and 33 are provided to divert the fluid, which is most greatly affected by these boundary layer and viscous forces, from the output pipes and to permit only a relatively small central portion of this fluid cylinder to be directed to the output sensing mechanism 29. It has been found that by limiting the fluid presented to the output sensing device 29 to a small central vertical region of the fluid, that the drag introduced by the side walls 14 and 16 may be reduced to a completely acceptable factor.

In operation, assuming initially that there is no vortical flow of the fluid through the chamber 23; that is, all flow is radial, equal proportions of the fluid in the chamber 23 strike bottom and top surfaces respectively, of the Archimedes screw type of device 29. The portion of the fluid, and reference is now made specifically to FIGURE 4 of the accompanying drawings, striking the upper surface of the device 29 has imparted thereto a counterclockwise rotation and therefore is carried upwardly into the pipe 26. Conversely, the portion of the fluid which strikes the bottom surface of the helical member 29 has clockwise rotation imparted thereto and is carried downwardly into the pipe 27. Since equal quantities of fluid are effected by the top and bottom surfaces, respectively, of the member 29, equal quantities of fluid are directed to the pipes 26 and 27 and therefore an output measuring device connected between the pipes 26 and 27 detects equal quantities of fluid in both pipes. This condition indicates that there is no vortical flow of the fluid. Such a detection device is illustrated subsequently with respect to FIGURE 5.

If, on the other hand, a vortical flow has been imparted to the fluid in the chamber 23, unequal quantities of the fluid are directed to the pipes 26 and 27. If, for instance, the fluid has a clockwise rotation imparted thereto, a greater portion of the fluid tends to follow the helical member 29 downwardly than follows the other sense of rotation of the member 29 upwardly. In consequence, the pipe 27 receives a greater proportion of the flow than the pipe 26 and a differential measuring device connected between the pipes detects this signal as an indication both of direction of flow and of magnitude of the circumferential velocity of flow. Increases in the vortical velocity increase the amount of fluid presented to the pipe 27 and in the limiting case, all of the fluid is presented to the pipe 27 and substantially none of it is carried to the pipe 26. On the other hand, if a counterclockwise flow has been imparted to the fluid, then the greater proportion of the fluid is presented to the pipe 26 than the pipe 27 and in the limiting case, all of the fluid is presented to the pipe 26 and substantially none of it is presented to the pipe 27. In consequence, the differential detection device connected between the pipes 26 and 27 is capable of determining both the direction and velocity of flow of the fluid in the vortex chamber.

Figure 5:
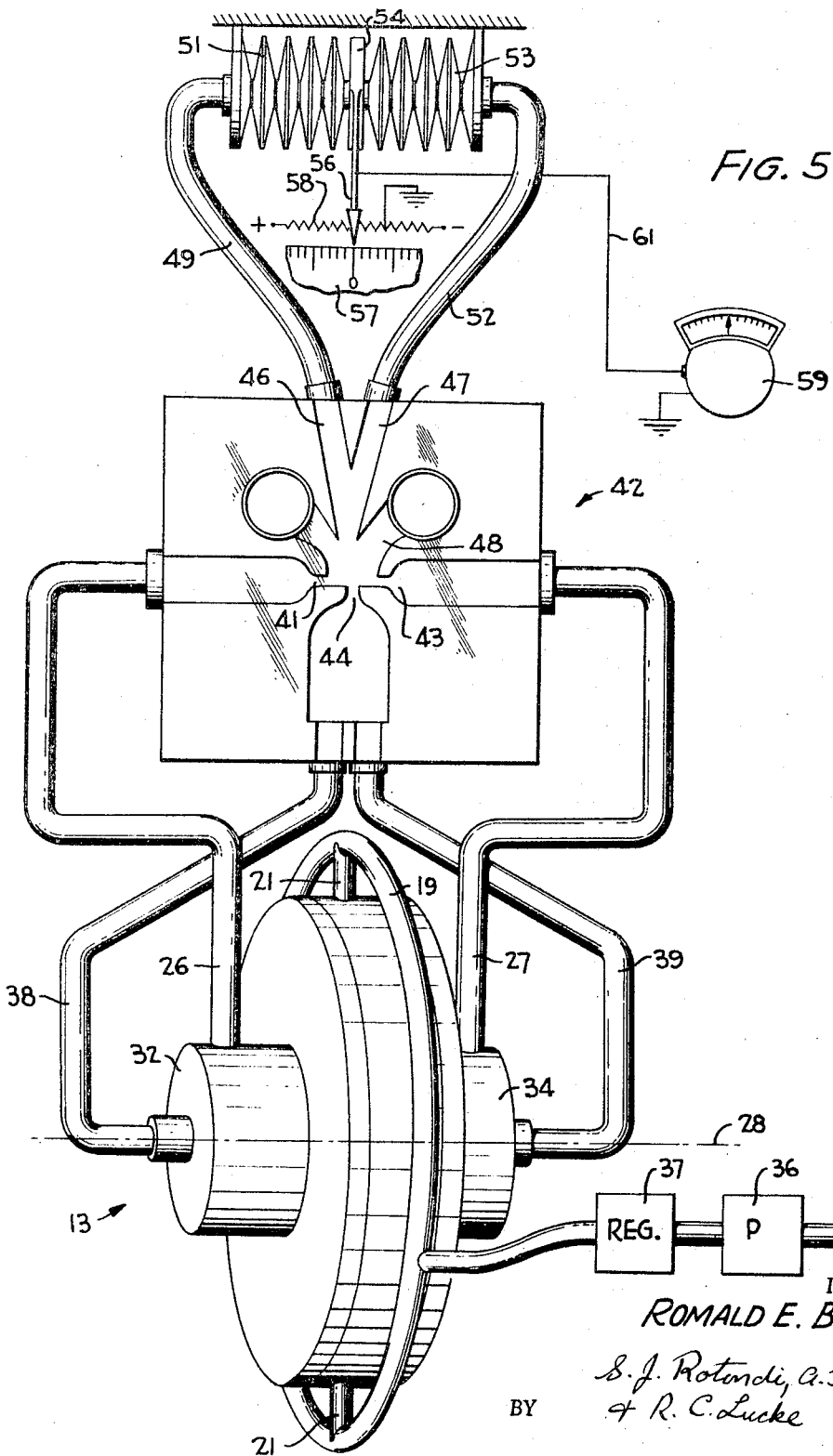
FIGURE 5 is a perspective view taken partially in section of an apparatus for measuring the fluid signals developed by the apparatus of FIGURE 2.

Referring now specifically to FIGURE 5 of the accompanying drawings, there is illustrated the rate sensing device 13 incorporated in a complete system for measuring the rate of rotation of a vehicle about one of its three principal axes. Fluid under pressure is supplied to the manifold 19 from a pump 36 via a pressure regulator 37. The pressure regulator is employed to minimize variations in pressure applied to the manifold 19 and therefore to the rate sensing device 13 so as to maintain suitable stability in the system. As will become apparent subsequently, the system is stable over some variations in pressure as a result of the method of utilization of the fluids presented on the one hand to the pipes 26 and 27 and on the other hand to pipes 38 and 39 which communicate with the chambers 32 and 34, respectively.

The pipe 26 is connected to a control orifice 41 of a pure fluid amplifier generally designated by the reference numeral 42. The pure fluid amplifier is described in the copending patent application of Billy M. Horton, Ser. No. 51,896, filed Sept. 19, 1960, and entitled "Fluid Operated System." The outlet pipe 27 is connected to a second control orifice 43 of the amplifier 42 and the pipes 38 and 39 are connected to a main or power orifice 44 of the amplifier 42. The amplifier 42 is provided with a first or lefthand outlet passage 46 and a second or righthand outlet passage 47. The fluid issuing into an interaction region 48 from the power orifice 44, in the absence of input signals to the control orifices 41 and 43, or in the presence of equal flows presented to these two orifices, proceeds along the center line of the device 42 and divides equally between the outlet orifices 46 and 47.

The outlet passages 46 and 47 are connected, respectively, via a pipe or tube 49 to a bellows 51 and via a tube or pipe 52 to a second bellows 53. The bellows 51 and 53 are aligned along a common axis and carry at their adjacent ends a plate 54. The bellows 51 and 53 are sealed relative to one another at the plate 54 so that the plate is deflected in accordance with the differential pressure applied to the bellows 51 and 53. The member 54 carries a pointer 56 which may be read directly against a scale 57 and is also connected as one element of an electrical circuit comprising a resistor 58 and a meter 59. The slider 56 is electrically conductive and is connected to the meter 59 via a lead 61 and the resistor 58 is connected across a suitable source of potential being grounded at its center point. In consequence, the polarity and magnitude of the voltage to which the meter 59 is connected is a function of the position of the slider 56 relative to the resistor 58, this being a conventional indicating system. It is to be understood that either the member 54 or the meter 59 may be replaced by control elements which may be utilized either in electrical or fluid systems, respectively, employed to control the position of a vehicle relative to the axis along which the center line 28 of the device 13 is disposed.

In operation, so long as the vehicle is stationary about its axis, no circumferential component of velocity is imparted to the fluid supplied to the system via the manifold 19. In consequence, equal quantities of fluid are presented to the pipes 26 and 27 therefore, the indicator 56 assumes a central position relative to the scale 57 and is at a grounded position relative to the resistor 58. Thus, the system indicates a condition in which there is no rotation of the vehicle relative to the axis which lies along the center line 28 of the device 13. However, if the missile rotates about the aforesaid axis, the device 13 is constrained to rotate therewith and therefore, there is established relative rotation between the fluid in the vortex chamber 23 and the physical elements of the device. The signal thus introduced is amplified by the action of the vortex amplifier and causes more fluid to be diverted to either one or the other of the outlet pipes 26 or 27. If, for instance, a greater portion of the fluid is diverted to the pipe 26, this fluid, upon issuing from the control orifice 41, diverts the power jet issuing from the orifice 44 toward the right so that a greater proportion of the fluid enters the outlet pipe 47 and is directed to the bellows 53. At the same time, due to deflection of the jet, there is a decrease in the amount of fluid presented in the pipe 46 and therefore the bellows 51. Consequently, the overall effect is to deflect the plate 54 and the pointer 56 toward the left. The rotational velocity of the fluid about the center line 28 of the device 15 is then indicated along the scale 27 as a function of the magnitude of deflection and the sense of rotation is determined by the sense of deflection of the pointer relative to the zero on the scale 57. With respect to the electrical circuit, the magnitude of the voltage is a function of the relative rate of rotation of the fluid with respect to the device 13 and the polarity of the voltage determines the direction of rotation.

Referring now to Equations 2 and 3, it is seen that the output functions are velocity functions and therefore, the indication provided by the apparatus illustrated in FIGURE 5 is a rate function.

In a control system for the vehicle, either the fluids in the pipes 49 and 51 or the voltage on the lead 61 may be employed to control the vehicle to terminate rotation of the device, termination of rotation being indicated when the system is again balanced at which time the pointer 56 returns to the zero position along the scale 57 and the grounded position of the resistor 58.

Referring now again to the amplifier 42, as explained in the aforesaid co-pending patent application of Billy M. Horton, this unit is a momentum interchange unit and by employing the portion of the fluid diverted to the chambers 32 and 34 as the source of fluid for the orifice 44, variations in the pressure applied to the manifold 19 are compensated. For instance, if the pressure supplied to the manifold 19 rises, thereby increasing the amount of fluid traversing the system, the momentum of the main jet issuing from the main orifice 44 is increased. However, there are corresponding increases in the amount of fluid, and therefore the momentum, of the jets issued from the control orifices 41 and 43. The overall effect is that the differential in momentum between the various streams is maintained constant and the ratio of quantities of fluid provided to the outlet passages 46 and 47 remains constant in spite of the increase in pressure. A corresponding action takes place as the pressure falls and the ratios of the momentums of the fluid in the various portions of the system remain the same even though the quantities of flow decrease. Thus, although only a small central portion of this fluid in the vortex chamber 23 is employed for signal purposes, the efficiency of the system is maintained by utilizing the fluid collected in the chambers 32 and 34 as the fluid for establishing the power or main jet into the reaction region 48 of the fluid amplifier 42.

In a device of the type illustrated in FIGURES 2 and 5, there is an inherent time delay between the attainment of a desired correction in the missile and a termination of the output signal indicating that this condition has been attained. Specifically, if the missile begins to rotate about a particular axis, an output signal is developed from the unit 13 which affects a control to discontinue rotation about this axis. However, since relative rotation has been established between the fluid in the chamber 23 and the device 13, an output signal will persist until all the fluid in the chamber, at the time that desired correction has been attained, exits from the chamber. If, for instance, it takes the fluid one second to traverse the radial distance between the porous wall 18 and the device 29 then, even though the missile has been stabilized about a particular axis, an output signal indicating rotation about that axis persists for one additional second. This, of course, can introduce instability in the system since there is a tendency to overcompensate which results in hunting of the missile about its neutral velocity condition.

Figure 6:
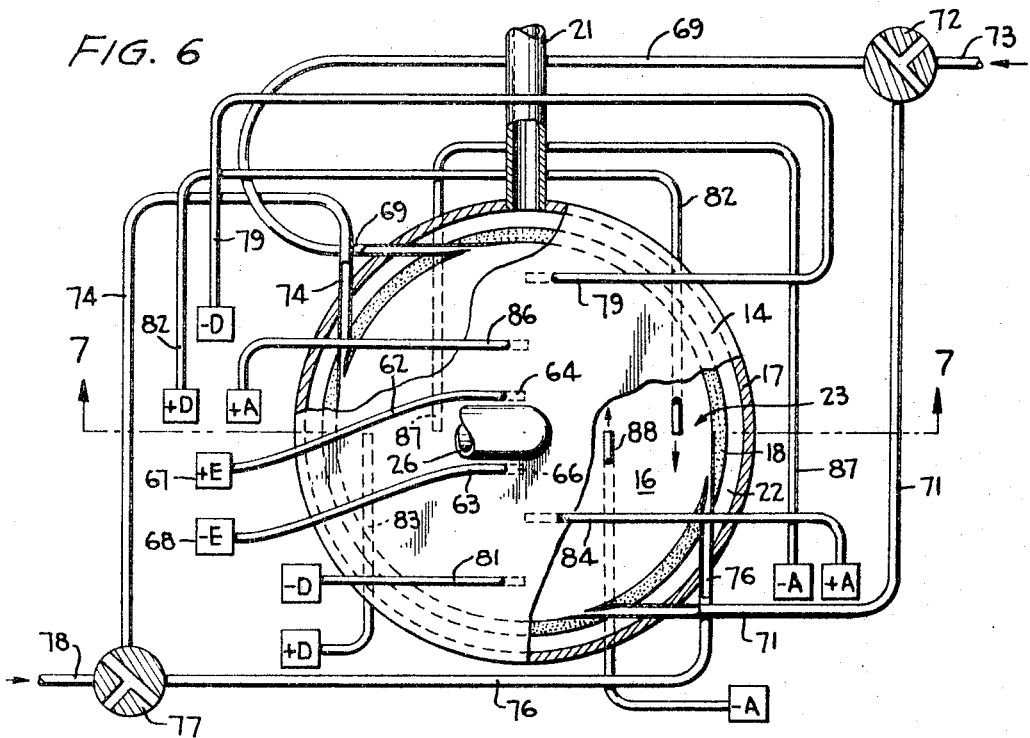
FIGURE 6 is an illustration of an apparatus for applying controllable rate of turn signals to the apparatus of FIGURE 1.
Figure 7:
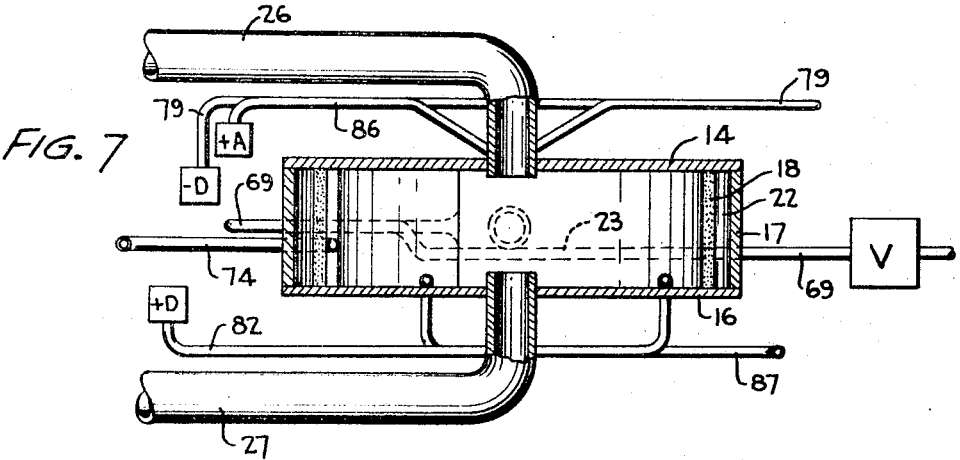
FIGURE 7 is a partial view in elevation of the apparatus of FIGURE 6.

The apparatus illustrated in FIGURES 6 and 7 of the accompanying drawings is intended to greatly reduce this inherent time delay in the unit and further to permit input signals to be fed to the system so that desired rotations of the missile about a particular axis may be effected. The basic unit illustrated in FIGURES 6 and 7 is identical with that illustrated in FIGURES 2 and 5 and comprises top and bottom walls 14 and 16, outer annular wall 17, inner porous annular wall 18 and vortex chamber 23. In FIGURE 6 only one of the inlet pipes 21 is illustrated and only one of the outlet pipes, for instance the pipe 26, is illustrated. The chambers 32 and 34 and elements 31 and 33 have been illuminated from the figures to permit a better view of the added elements.

In order to reduce the response time of the apparatus and particularly to reduce the lag in detection of the discontinuance of rotation of the missile about the center line 28, there is provided a pair of pipes 62 and 63. The pipe 62 is located immediately adjacent the pipe 38 and in embodiment employing the triangular porous member 31 this pipe may extend through the porous member and terminate in a right angle member 64 so that fluid introduced through the pipe 62 has a clockwise tangential velocity component. The pipe 63 terminates adjacent the pipe 26 and may also extend through the member 31 or alternatively through the member 33 and terminates in a pipe 66 perpendicular to pipe 63 and directed so that when fluid is applied thereto it imparts a counterclockwise rotation to the fluid adjacent the outlet. The pipes 62 and 63 are connected to sources of pressure 67 and 68 identified as E+ and E−, respectively. Actually, both of these sources are positive pressures, the plus and minus signs indicating relative directions of rotation. The pipes 62 and 63 are normally connected to a common source of pressure through a valve which may terminate flow in both pipes or establish flow in one or the other, alternatively. In operation, upon sensing that the missile has stopped rotating about the center line of the vortex unit, one or the other of the pipes 62 or 63, as determined by the initial sense of rotation of the unit, has fluid pressure applied thereto which fluid issues into the vortex chamber 23. Since the pipes are located close to the detection pipes 26 and 27, the time delay required for this fluid to have an effect upon the fluid reaching the pipes 26 and 27 is quite small and may be of the order of magnitude of a tenth of a second. By choosing the mass flow proceeding through the pipes 62 and 63 such that this fluid, upon issuing into the vortex chamber, exactly balances the rotational flow which resulted from prior rotation of the unit with respect to the fluid, the rotational velocity of the fluid may be terminated and result in termination of the output control function.

Two factors must be taken into account with respect to the fluid applied via pipes 62 and 63. First, since very little amplification is obtained in the unit, so that the pressure or flow rate of the fluid must normally be greater than the pressure which proceeds through the porous wall 18. Further, the rate of flow through the pipes 62, 63 must be a function of the signal previously detected by the apparatus since it is desired to terminate the rotational flow producing the signal. Obviously, this information is obtainable from the control circuitry which relies upon this precise information.

To achieve more uniform control, there should preferably be two pipes 62 disposed on opposite sides of the pipe 26 and two pipes 63, also diametrically opposed, so as to provide two rotational couples. In order to reduce interaction between the pair of pipes 62 and 63, the pipes may proceed through the top wall 14 and the two pipes 63 proceed through the bottom wall 16.

In order to insert command signals into the apparatus there is provided a first pair of pipes 69 and 71 which extend through the outer wall 17 and the porous wall 18 and are tangential to the porous wall 18 where they enter the vortex chamber 23. These two pipes are connected through a valve 72 and to a source of pressure, not illustrated, via a pipe 73. When it is desired to introduce fluid tangentially into the vortex chamber 23, the valve 72 is positioned to connect both of the pipes 69 and 71 to the source of pressure. When fluid is thus introduced into the system, a clockwise rotational flow is set up in the vortex chamber 23 and after this fluid has proceeded through the chamber and reaches the outlet pipes 26 and 27, a control signal is instituted. In order to be able to alternatively set up counterclockwise flow in the chamber 23 there are provided pipes 74 and 76 which also pass through the walls 17 and 18 and are tangential to the wall 18 at the point of entry into the vortex chamber. The pipes 74 and 76 are connected through a valve 77 and to a source of fluid pressure not illustrated via a pipe 78. Thus, the valves 72 and 77 selectively permit either clockwise or counterclockwise flow to be initiated in the vortex chamber depending upon the direction of rotation it is desired to impart to the missile or other vehicle. Alternatively, or concurrently therewith, fluid may be introduced via the pipe 62 or the pipe 63 so as to reduce the time required to institute the control function. Obviously, there is an inherent delay, and in the example chosen above, a delay of one second, between operation of the valve 72 and 77 and the initiation of the control function since it takes this amount of time for the fluid to traverse the space between the wall 18 and the detection device 29. The two systems of pipes 62, 63 and 69, 71 and 74, 76 may be used separately or concurrently for input commands, the advantage arising from use of the pairs 69, 71 and 74, 76 being that one obtains amplification of the signal while the advantage to use of pipes 62, 63 resides in the small time delay. In a given system, fluid may be introduced through one of the pipes 62 or 63 and concurrently through one of the pairs of pipes 69, 71 or 74, 76 flow through the pipe 62 continuing only until the rotating fluid established by the corresponding pair 69, 71 reaches the outlet device at which time flow through the pipe 62 may be terminated.

Fluid may be introduced through pipes at other locations throughout the vortex chamber. For instance, pipes 79 and 81 introduce fluid to produce counterclockwise rotation at a position close to the wall 18 while pipes 82 and 83 may introduce fluid at corresponding locations but in a clockwise direction. Pipes 84 and 86 may introduce fluid to produce clockwise rotation at approximately the center of the vortex chamber whereas corresponding pipes 87 and 88 introduce fluid producing counterclockwise rotation at radial locations corresponding to the pipes 84 and 86. Any combination of the various pipes discussed above may be employed to either introduce signals into the system or to balance the effect of signals previously introduced and whose function is to be terminated.

It should be noted that the pipes which are introduced into the system inwardly of the porous wall 18 terminate in relatively small openings adjacent either a top or bottom wall of a system as illustrated clearly in FIGURE 7. However, the pipes such as 71, 69, 74 and 76 which extend through the porous wall 18 actually terminate in a passage in the wall 18 which extends throughout the vertical height of the apparatus between the walls 14 and 16, this arrangement providing more uniform effect upon the system and, where possible, it is preferable to use this design.

Figure 8:
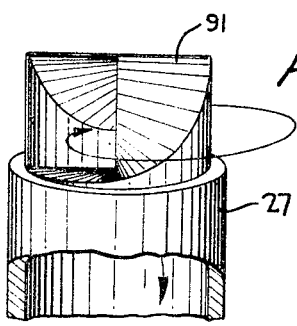
FIGURE 8 illustrates another apparatus for determining the direction of rotation of the fluid at the center of the apparatus of FIGURE 2.

Referring now specifically to FIGURE 8 of the accompanying drawings, there is illustrated an alternative arrangement for detecting the direction and magnitude of tangential or rotational flow existing at the center of the vortex chamber 23. The pipe 27 corresponding to the pipe 26 terminates in a fluid scoop 91 symmetrical with the center line of the pipe 27. The scoop 91 is adapted to accept fluid flowing in a clockwise direction and to tend to reject fluid flowing in a counterclockwise direction. A corresponding scoop is located in the upper tube 26 but having a sloping surface such that it will accept fluid having a counterclockwise rotation and reject fluid having a clockwise rotation. These scoops extend into the central vertical region as viewed in FIGURES 2 and 7 so as to accept the fluid which is not taken off by the devices 31 and 33.

FIGURES 9 and 10 illustrate another arrangement for detecting rotation of the fluid which constitutes a plurality of fingers 92 extending into the upper vertical portion of the vortex chamber 23. These fingers, as viewed from the top as illustrated in FIGURE 9, have a clockwise directivity. A further set of fingers 93, which are mounted on a central hub, extend into the lower sensing region in the chamber 23 and extend from the hub in a generally counterclockwise direction. The fingers 92 and 93 are separated by a plate 95 having a radius equal to the maximum radius of the fingers. If now there is radial flow only through the vortex chamber 23, equal amounts of flow proceed through the pipes 26 and 27. However, if the direction of flow is counterclockwise, the fingers 92 will scoop up the flow whereas the fingers 93 will tend to reject the flow. Specifically, the flow will strike a surface of the fingers 92 having an inclination toward the pipe 26 and therefore the fluid is directed toward the pipe. Conversely, the fluid striking the fingers 93 contact a surface directed away from the pipe 27 and is caused to flow away from the pipe. Conversely, if the fluid flow is clockwise, the fingers 93 will direct the flow toward and through the pipe 27 and fingers 92 tend to reject the flow and to divert it radially outwardly away from the pipe 26. The amount of fluid passing into either of these arrangements is a function of its tangential velocity and in a limiting case, one set of fingers directs all of the fluid to its associated pipe whereas the other set of fingers rejects all of the fluid and prevents any substantial flow into its associated pipe.

Figure 11:
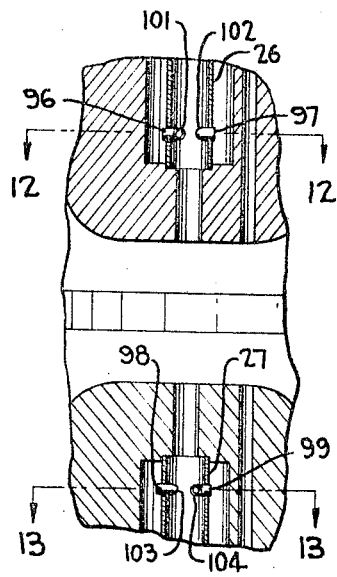
FIGURES 11 through 13 are various views of yet another apparatus for determining direction of rotation of the fluid at the center of the vortex unit.
Figures 12, 13:
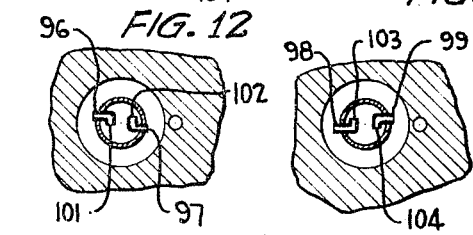

Referring now specifically to FIGURES 11 through 13, there is illustrated another system for sensing the direction of rotational flow in the vortex chamber 23a. In this modification of the sensing apparatus, the pipes 26a and 27a have extending through the walls thereof pipes 96 and 97 associated with the pipe 26a and pipes 98 and 99 associated with the pipe 27a. The pipes 96 and 97 terminate in oppositely directed sections 101 and 102 having their ends open. The pipes 96 and 97 located in the pipe 26 detect clockwise rotation of the fluid in the pipe 26 when viewing the arrangement from the top whereas these pipes tend to prevent fluid rotating counterclockwise from entering the open ends 98 and 99. The tubes 98 and 99 associated with the pipe 27 terminate in oppositely directed open ended section 103 and 104. These open ended sections 103 and 104 are directed such that they accept liquid rotating counterclockwise as viewed from the top of the figure but tend to reject fluid rotating clockwise. In this arrangement, equal quantities of fluid enter the pipes 26 and 27 and are, in this instant, conveyed directly into the chambers 32 and 34 illustrated in FIGURE 2. The relative quantities of fluid extracted from these tubes by the pipes 96 and 97 on the one hand and 98 and 99 on the other are determined by the direction of flow of the fluid. The pipes 96 and 97 are eventually connected together and feed one of the control orifices of the fluid amplifier 42 while the pipes 98 and 99 are eventually connected together and feed the other control orifice of the amplifier 42.

The arrangements illustrated in FIGURES 8 and 9 and 10 and 11-13 may be used alternatively with the helical device 29 illustrated in the prior figures and produce the same end effect in the system.

Referring now specifically to FIGURE 14 of the accompanying drawings, there is illustrated a modified form of the apparatus of the present invention which is specifically directed to utilization at very high altitudes where, if liquid is used in the device, there would normally be a tendency for the liquid to boil due to the lowering of the static pressures of the liquid in the vortex chamber to pressures below the vapor pressure of the liquid at these high altitudes. The unit comprises an upper circular wall 106 and a lower circular wall 107. The walls have disposed therebetween at their outer edges an annular wall 108 and fluid is supplied to the interior of the wall 108 via a pipe 109 fed from a manifold device not illustrated. Located between the walls 106 and 107 and inwardly of the annular wall 108 is a vertically centered porous member 111 shaped to define a fluid orifice or jet of the general type illustrated as the orifice 44 of the amplifier 42. This porous annulus is mounted between an impervious upper annular member 112 and an impervious lower annular member 113. The outer radial portions of the annuli 112 and 113 define a region for accepting the porous plug 111 and the inner portions of the annuli 112 and 113 define a vortex chamber 114 having walls diverging outwardly towards the center of the unit. The outwardly diverging walls of the members 112 and 113 are dimensioned with respect to the contours of the annular porous member 111 such that the fluid flowing into the chamber completely fills the vortex chamber 114; that is, the fluid at the edges of the orifice defined by the members 111, 112 and 113 stays attached to the walls of the chamber.

An upper outlet pipe 116 is coaxial with the center line of the device and an opposed lower outlet pipe 117 is spaced from the pipe 116 and is also coaxial with the center line of the unit. The pipe 116 is surrounded by a porous member 118 which extends from the lower edge of the pipe 116 into a chamber 119 which receives overflow fluid through the porous member 118 in the same manner that the chamber 32 receives fluid from the vortex chamber 23 through the member 31 in FIGURE 2. A porous member 121 which is a mirror image of the member 118 is disposed about the pipe 117 and extends from the upper edge of the pipe 117 into a chamber 122 corresponding with the chamber 34 of FIGURE 2. Thus, the fluid in the chamber 114 which does not enter the pipes 116 and 117 is carried into chambers 118 and 122 which are connected via pipes 123 and 124 to the power or main orifice 44 of a fluid amplifier 42. A member 126 which is of the type illustrated in FIGURES 9 and 10 is disposed between the pipes 116 and 117 in the vortex chamber 114 and is employed to sense the direction and velocity of rotation of the fluid in the chamber.

The outwardly diverging walls provided by the annular members 112 and 113 reduce the radial but not the circumferential velocity of the fluid proceeding through the vortex chamber 114 relative to the velocity of the fluid in the vortex chamber 23 of the device of FIGURE 2 so as to prevent a substantial lowering of the static pressure of the fluid in the unit. For instance, the divergence of the walls of the members 112 and 113 may be such that there is no increase in radial velocity of the fluid across the vortex chamber and therefore there is relatively little reduction in static pressure of the fluid within the unit.

For reasons which will become apparent subsequently, it is important to note that the arrangement of FIGURE 14 does not produce a jet of fluid into the chamber which maintains its integrity across the vortex chamber. The nozzle-like design is employed merely to cause the fluid to adhere to the walls of the chamber and all of the fluid is subject to vortical flow. As previously indicated, when operating at very high altitudes there is a danger that the static pressure within the vortex chamber may fall below the vapor pressure of the fluid at these altitudes if steps are not taken to prevent this effect. Under these circumstances, the fluid in the unit would boil and completely destroy the information contained in the velocity and direction of rotation of the fluid. As indicated above, this is prevented by the design of the apparatus illustrated in FIGURE 14.

The pipes 116 and 117 are connected to the control orifices of a fluid amplifier 42 and the remainder of the detection system illustrated in this figure is identical with the detection system illustrated in FIGURE 5. The corresponding elements of the two figures bear the same reference numeral for purposes of clarity of description.

It should be noted that, in a device of the type illustrated in FIGURE 14, due to the reduction in radial velocity of the fluid through the unit, the response time of the unit is decreased; that is, the time delay between the discontinuance of a signal or the insertion of a signal is increased due to the reduction in velocity of the fluid in the unit. The various compensation signals for decreasing time delay as illustrated in FIGURE 6 may be employed in this embodiment of the invention to produce a substantial reduction in the time delay of the unit.

Figure 15:
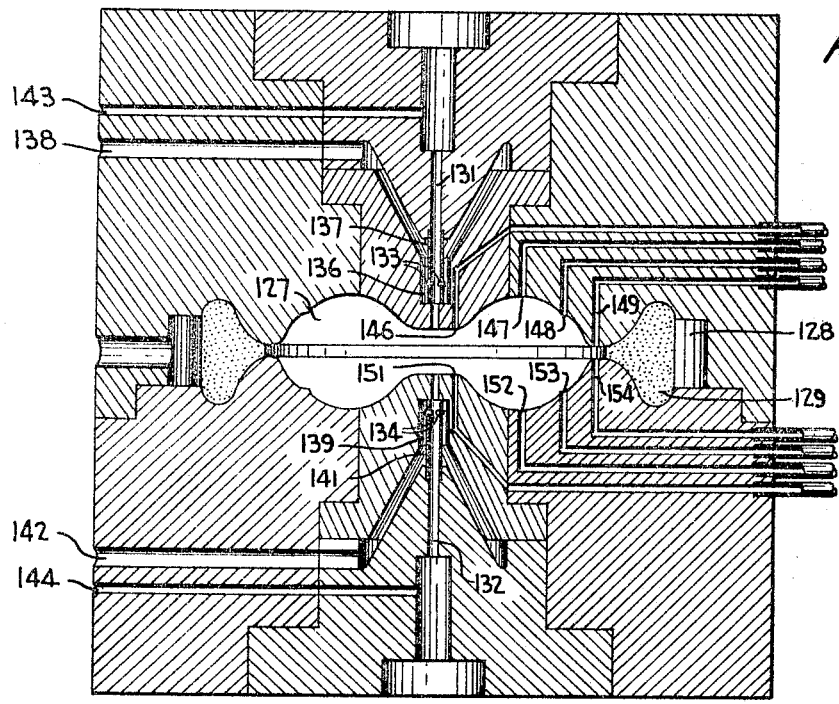
FIGURE 15 is a vertical section through an apparatus for providing both rate and position signals in accordance with the present invention.

Referring now specifically to FIGURE 15 of the accompanying drawings, there is illustrated another embodiment of the invention employed to derive both a rate and a position signal from the apparatus of the present invention. The apparatus comprises a vertically contoured vortex chamber 127 which is supplied with fluid from an annular chamber 128, disposed about the vortex chamber, through a contoured annular porous member 129. The annular porous member 129 is contoured to provide a fluid flow into the vortex of the chamber 127 which adheres to the walls of the vortex chamber in the same manner that the fluid adheres to the walls of the vortex chamber in the embodiment of the invention illustrated in FIGURE 14. Located along the center line of the unit illustrated in FIGURE 15 is an upper pipe 131 and a lower pipe 132. Extending into the pipe 131 are two pipes 133 and extending into the pipe 132 are two pipes 134, pipes 133 and 134 corresponding to the pipes illustrated in FIGURES 11 through 13. Therefore, pipe arrangements 133 and 134 sense direction of rotation and amount of rotation of the fluid at the exit from the vortex chamber 127.

The pipes 133 communicate with a chamber 136 which is disposed about the pipe 133 and isolated therefrom by means of a thin cylindrical member 137. The chamber 136 communicates with a passage 138 through the wall of the apparatus.

Similarly, the pipes 134 communicate with an annular chamber 139 disposed about the pipe 132 and isolated therefrom by a thin cylindrical wall 141. The chamber 139 communicates with a passage 142 which passes through the wall of the device and is eventually connected to a pure fluid amplifier such as the amplifier 42 of FIGURE 5. The apparatus is further provided with a plurality of passages terminating at both the upper and lower surfaces of the vortex chamber 127. Specifically, passages arranged to communicate with the upper surface of the chamber are indicated by reference numerals 146, 147, 148 and 149 and those communicating with the chamber 127 through the lower surface of the chamber are, in the same order, passages 151, 152, 153 and 154. These passages are connected with external pipes which bear the same reference numerals as the passages. As previously indicated, the static pressure within the vortex chamber is a function of both the radial and tangential velocities of the fluid therein. Further, since there is a predetermined interval required for the fluid to flow from the inlet to the outlet of the vortex chamber 127, a device for sensing the pressure distribution through the chamber senses approximately an integrated function of the variations in signals applied to the unit. Specifically, if one assumes that over the interval $\tau$, which is the interval required for the fluid to flow from the input to the output of the chamber 127, there is no change in the tangential flow rate then the static pressures sensed at the pipes 146 and 149 may either be made to be equal or have a predetermined known differential in pressure. The actual differential in pressure under these circumstances between the pipes 146 and 149, if such exists, is a function of the profile of the upper and lower walls of the chamber 127. If, however, during the interval $\tau$ there is a variation in the tangential velocity of the fluid, the differential in pressures sensed by the pipes 146 and 149 is a function of the average tangential velocity assuming a uniform variation of velocity over the time $\tau$ of the fluid in the chamber. This differential in pressure therefore indicates the change in position of the missile over the interval $\tau$. Thus, the static pressure difference between the pipes 146 and 149 provides a signal indicative of the position of the apparatus whereas the differential in pressure between the pipes 138 and 142 provides a signal indicative of the rate of rotation of the apparatus. These signals may be employed in distinct sensing and control devices or may be combined into a single signal of the form $$\epsilon = A\omega + B\int \omega dt \qquad (4)$$

Equation 4 is the standard equation for a combined rate and position signal employed in servo systems and the stability of the system is a function of the ratio of the factors A and B. By suitably proportioning the device of FIGURE 15 and/or by controlling the amplification of the two signals, a stable system may be developed.

The contouring of the walls of the vortex chamber 127 is employed to permit appropriate placement of the various static pressure sensing passages so that these passages are not crowded too close together or do not sense such very small differences in static pressure so that the variations therein are almost indistinguishable. Thus, referring now to the passages 147 and 148, which are employed to determine signals integrated over a shorter interval of time if such is desired, if the contouring of FIGURE 15 were not employed these passages would sense pressures which were practically identical and which differed from one another by an amount less than the accuracy of the system. The use of contoured walls, however, permits sensing of static pressures which are quite different and greater than the inherent errors in the apparatus.

Figure 16:
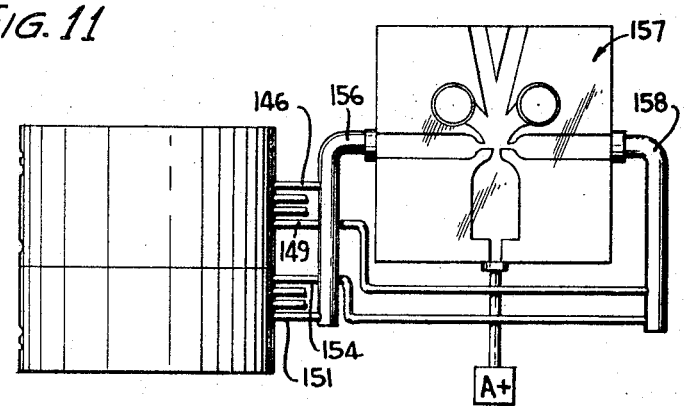
FIGURE 16 illustrates the connection of the device of FIGURE 15 to a measuring system.

Referring now specifically to FIGURE 16 of the present invention, there is illustrated a system employing the integrated signals derived by the apparatus of FIGURE 15. The outlet passages 146 and 151 are both connected to a pipe 156 which feeds one control orifice of a pure fluid amplifier 157. Thus, one control orifice of the unit 157 is supplied with a signal indicative of the static pressure existing in a region of the chamber 127 adjacent the center line thereof. The pipes 149 and 154 are connected together and the pressure sensed is supplied to a pipe 158 which supplies the other control orifice of the amplifier 157. The main power orifice is returned to a suitable source of pressure and the signal developed across the outlet passages for the unit 157 are indicative of the average of the velocities of the fluid in the vortex chamber. If it is desired to produce completely separate rate and position signals, the system illustrated in FIGURE 16 may be employed. However, if it is desired to combine the rate and position signals, the passages 138 and 142 of the unit of FIGURE 15 may also be connected to the pipes 156 and 158 so that the output signal from the amplifier 157 is of the form indicated in Equation 4 above. In this embodiment of the invention, the fluid appearing in the passages 143 and 144 may be applied to the main power orifice of the device 157 so that the system assumes the form illustrated in FIGURE 5.

Figure 17:
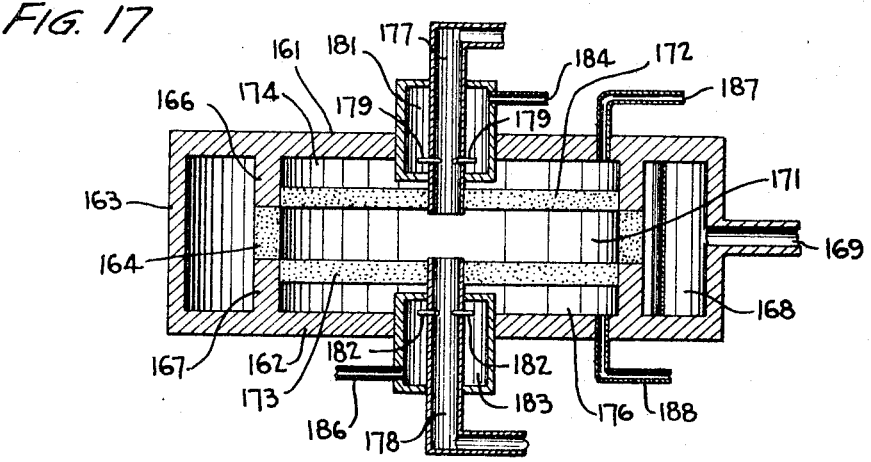
FIGURE 17 illustrates a vortex rate measuring apparatus modified to provide signals indicative of the integral of the rate signal of a predetermined time interval.

Referring specifically to FIGURE 17 of the accompanying drawings, there is illustrated a modification of the apparatus of FIGURE 15 which provides a more nearly true integral of the signals in the vortex chamber. The apparatus is provided with a top wall 161 and a bottom wall 162 and an annular end wall 163 all of which are concentric about the center line of the unit. Spaced inwardly from the wall 163 is an annular porous wall 164 supported between an upper annular wall 166 and a lower annular wall 167. A fluid receiving chamber 168 is defined between the wall 163 and the vertical wall comprising the annuli 164, 166 and 167. Entry to the chamber 168 is obtained through a plurality of pipes 169, only one of which is illustrated in FIGURE 17. There is provided a vortex chamber 171 defined by the porous annulus 164 and an upper disc-shaped porous member 172 and a lower disc-shaped member 173. For purposes which will be described subsequently, the member 164 is considerably more porous than the members 172 and 173, these latter two members being sufficiently porous to permit some fluid to be transmitted therethrough but preventing an appreciable flow of fluid therethrough. A chamber 174 is defined by the walls 161 and 166 and the porous member 172 and a corresponding chamber 176 as defined by the bottom wall 162, the annular member 167 and the porous wall 173. Coaxial with the center line of the unit is a pipe 177 which extends through the porous member 172 into the vortex member 171 and a lower pipe 178 which extends through the porous member 173 also into the vortex chamber 171. A pair of pipes 179 of the type illustrated in FIGURES 11 through 13 extend between the interior of the pipe 177 and a chamber 181. Similarly, pipes 182 provide communication between the pipe 178 and a chamber 183 disposed about the pipe 178.

In operation, fluid is introduced through the pipe 169 into the chamber 168 and thence through the porous wall 164 into the vortex chamber 171. Vortical flow is sensed by the pipes 179 and 182 and signals developed in the chambers 181 and 183 as a result of the flow sensed by the unit are supplied through the pipes 184 and 186 to external circuits in the same manner as described with respect to FIGURE 15. At the same time, signals are developed in the chambers 174 and 176 which are indicative of the static pressure distribution along the entire flow path between the porous wall 164 and the outlet pipes 177 and 178. Since the fluid pressure in these two chambers is a function of the static pressure distribution throughout this entire region, these signals represent a true integrated rate signal, integrated over the time $\tau$ required for the fluid to proceed from the porous wall 164 to the region of the pipes 177 and 178. Thus, the signals developed in the chambers 174 and 176, and which are supplied to outlet pipes 187 and 188, are error signals which may be supplied to a common pipe and employed in a control system as the error signal. The signals supplied to the pipes 184 and 186 on the other hand constitute differential velocity signals and may be employed as illustrated in FIGURE 5, etc. The system of FIGURE 17, when the two signals are combined, provides a signal in conformance with Equation 4 and may be employed in an automatic control apparatus of the general nature described above.

Referring now specifically to FIGURES 18 through 21 there is illustrated another device for providing combined error and rate signals. This apparatus employs the combined operation of two vortical flow patterns in a fluid vortex unit, each flow pattern having different radial components of velocity. The unit includes an outer annular wall 191, a top wall 195 (FIGURE 19) and a bottom wall 192, to form a flat hollow cylinder. Disposed inwardly of the annular wall 191 and between the top and bottom walls is a porous annular wall 193 extending between the top and bottom walls and defining inwardly thereof a fluid vortex chamber 194. In the embodiment of the invention illustrated in FIGURE 18, four passages 196 are provided through the porous wall 193, the passages being confined to the central vertical portion of the porous wall and permitting a free flow of fluid therethrough. The passages 196 extend radially and therefore direct streams of fluid toward the center of the cylinder. These streams of fluid form a secondary vortical flow having a high radial velocity component relative to the main vortical flow.

Disposed along the center of the unit is a receptor apparatus 197 illustrated in detail in FIGURES 19 through 21. The receptor 197 has four receiving arrangements 198 disposed at 90° with respect to one another and in radial alignment with the passages 196 through the porous wall 193. Each of the arrangements 198 includes a pair of vertically extending passages 199 and 201. The passages 201 increase uniformly in diameter from the bottom of the unit towards the top whereas the passage 199 increases uniformly from the top towards the bottom of the unit. The passages 199 are closed at the top of the unit 197 whereas the passages 201 are closed at the bottom of the unit. Conversely, the passages 199 are open at the bottom of the unit and the passages 201 are open at the top of the unit. The passages 201 are open at the top of the unit. The passages 201 communicate with a vertically aligned pipe 202 and the passage 199 communicates with a vertically aligned pipe 200 extending from the bottom of the unit 197. The entrances to the passages 199 and 201 are partially blocked by curved fingers 203 and 204 for purposes to be described subsequently. The passages 199 and 201 are separated by a radially directed and vertically extending cusp 206 to provide a sharp division between the channels. It is not intended to limit this to a configuration wherein the divider has a sharp edge.

Completing a description of the apparatus, fluid is applied to a region 207 subsisting between the walls 191 and 193 through an inlet pipe 208, the flow being directed radially towards a deflector 209 which prevents the flow from impinging directly on a region of the porous wall 193 for purposes previously described. There may be provided a number of inlet pipes 208 fed from the manifold such as the manifold 19 of FIGURE 2 only one of these pipes being illustrated in FIGURE 18.

Disregarding for the moment the effect of the main fluid vortex within the vortex chamber 194, the fluid applied via the inlet pipe 208 is under such a pressure that four well defined streams issue towards the member 197 from the passages 196. If the unit is not rotating, the fluid of the streams divides equally between the passages 199 and 201 so that equal amounts of fluid are directed to the upper and lower outlet pipes. These pipes may be connected, for purposes of illustration, to a differential pure fluid amplifier, such as the amplifier 42 of FIGURE 5, or other suitable pressure differential measuring apparatus. In the event, however, that the unit illustrated in FIGURE 18 is rotating, this fluid flow is vortical and curves from a straight line and depending upon the rate and direction of rotation a greater or lesser amount of fluid is directed to one or the other of the passages 199 and 201. For instance, if the unit is rotating clockwise, then the circumferential velocity component of a stream issuing from a passage 196 is greater than the circumferential velocity of the divider 206 which has a relatively small radius as compared with the radius of the porous wall 193 which establishes the initial circumferential velocity component of the jets. Further the circumferential velocity component of the fluid stream issuing from passage 196 is amplified by conservation of angular momentum in the fluid stream's vortical flow towards unit 197. Therefore, with clockwise rotation of the device, more fluid flow is directed, and reference is now made to the lowermost set of passages 198 in the apparatus as illustrated in FIGURE 20, to the lefthand passage which, for purposes of explanation, is considered to be the passage 201 than is directed to the passage 199. Therefore, the greater proportion of the fluid is directed upwardly to the upper outlet pipe 202 than is directed to the lower outlet pipe 200 and a differential in fluid flow and therefore pressure is developed between these two pipes. If, on the other hand, the rotation of the unit is counterclockwise, the vortical stream has greater circumferential velocity than the unit 197 and as a result of this vortical flow a greater proportion of the fluid is directed to the righthand passage 199 than to the lefthand passage 201. It is apparent from the above that the pipe 200 or 202 having the higher pressure or flow rate identifies the direction of rotation of the unit and the ratio of the pressures determines the velocity of flow. In the limiting case, all of the fluid stream is directed to one or the other of passages 199 and 201 depending upon the direction of rotation.

The radial velocity of the stream issuing from the passages 196 is sufficiently great that the time delay across the vortex chamber is negligible and therefore, the unit as thus far described provides an output signal which is a function of the instantaneous rate of rotation of the missile about an axis parallel to the axis passing through the center of the unit illustrated in FIGURE 18 or more particularly the center of the receptor 197 in a direction normal to the drawing.

Disregarding, now, the effects of the streams issuing from the passages 196 and considering only the main fluid vortical flow in the chamber 194 which is derived from the flow through the porous wall 193, the output flow through 200 and 201 of the unit illustrated in FIGURE 18 is insensitive to either the direction or rate of rotation of this fluid. This effect is a result of the curved fingers 203 and 204 which limit direct entry of rotating fluid into the passages 199 and 201, regardless of the direction of rotation. Thus, the unit is unaffected by direction and rate of flow and in the absence of streams issuing from the passages 196 and substantially equal quantities of fluid are supplied to both of the passages 199 and 201.

Considering now the combined operation of the apparatus illustrated in FIGURE 18; that is, the operation of the vortical fluid streams in conjunction with the main vortical flow established by fluid which has entered the vortex chamber through the porous wall 193, if the unit is not rotating, there is no rotation of the fluid in the vortex chamber 194 and no circumferential deflection of the streams issuing from the passage 196 relative to the receptor 197. All of the fluid divides equally between the passages 199 and 201. Consider now the case where the unit is rotating at a constant velocity in a predetermined direction. The streams issuing from the passages 196 are in effect deflected relative to the dividers 206 of the receptor 197 by an amount and in a direction determined by the rate and direction of rotation of the unit. The fluid entering the vortex chamber is rotating relative to the receptor 197 in the same direction as the apparent rotation of the streams relative to the receptor. Also, the rate of rotation of the main fluid in the vortex unit is the same at each radial position of the unit as the rotation of the stream at each corresponding radial position. In consequence, the main fluid in the vortex unit has no effect upon the displacement of the stream relative to the receptor 197 and the same differential in signal is developed between the outlet pipes as would be developed in the absence of the main fluid. However, if during the time $\tau$ which is the time required for the fluid entering the chamber 194 through the porous wall 193 to proceed from the porous wall to the receptor unit 197, there is a change in rotational velocity of the unit then the local circumferential components of velocity of main fluid flow between the porous wall 193 and the receptor 197 differ from the circumferential components of velocity of the fluid stream. This produces an effect upon the position of the vortical stream relative to the divider 206. The total effect of the main vortical fluid in the chamber 194 upon the position of the vortical streams is a summation of the effects of the velocities at each incremental radial location of the main fluid in the vortex chamber. This summation occurs over the time $\tau$ required for the main fluid in the chamber 194 to proceed through the chamber. Thus, the ultimate deflection of the streams relative to the dividers 206 of the receptor 197 is a function both of the instantaneous rate of rotation of the unit and the history of rotations over the preceding interval $\tau$. It must be remembered in this context that the streams issuing from the passages 196 must retain their integrity throughout the radial length of the vortex chamber 194 and are effected only to the extent of their deflection relative to the dividers 206. Since the ultimate deflection of the streams is the function of the instantaneous rate of rotation of the unit plus a pseudo-summation of the prior instantaneous rotations over the time $\tau$, the final deflection of the stream is expressed by an equation of the form of Equation 4 above. Thus, the final differential in pressures or flows in the outlet pipes constitutes a combination of both a position and rate signal which for reasons indicated above is the desired signal for application to control systems of the type with which the apparatus of the present invention is to be employed.

In the apparatus of FIGURE 18, the unit is not intended to be limited to the utilization of four jets, since other numbers of jets may be employed. The unit illustrated, however, provides a relatively large flow to the outlet pipes without requiring a receptor of extreme complexity.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A device for measuring the rate and direction of rotation of a body, said device comprising a chamber having a circular cross-sectional area, the circular cross-sectional area having an axis which passes through the center of and is perpendicular to said area, said chamber being positioned such that the axis of the circular cross-sectional area has a component parallel to an axis of rotation of the body, means for introducing into said chamber adjacent its outer periphery fluid having substantially only a radial velocity, a pair of opposed and spaced outlet passages aligned along the axis of said area and directed toward said chamber from opposite directions, and measuring means for developing a fluid signal proportional to the direction and rate of rotation of fluid in a region of said chamber generally defined by said outlet passages.

2. A device for measuring the rate of rotation of a body, comprising means defining a region having included therein a generally circular cross-sectional area, said cross-sectional area having an axis which passes through the center of and is perpendicular to said area, said device being positioned such that the axis of the generally circular cross-sectional area has a component parallel to an axis of rotation of the body, means for introducing into said region adjacent its circumference fluid having substantially only a radial velocity, at least one outlet passage for said fluid located substantially coaxial with the axis of said area, and sensing means for developing a fluid signal proportional to the rate of rotation of the fluid in a portion of said region generally defined by said outlet passage.

3. The combination according to claim 2 wherein the diameter of said circular cross-sectional area is at least an order of magnitude larger than the diameter of said outlet passage.

4. The combination according to claim 2 further comprising flow means for introducing into said region fluid having an initial tangential velocity relative to said region.

5. The combination according to claim 4 wherein said flow means comprise a pair of diametrically opposed pipes extending into said region and having the same directivity.

6. The combination according to claim 4 wherein said flow means is located adjacent said outlet passage.

7. The combination according to claim 4 wherein said flow means is located adjacent the periphery of said circular cross-sectional area.

8. The combination according to claim 4 wherein said flow means is located intermediate said outlet passage and the periphery of said circular cross-sectional area.

9. The combination according to claim 2 wherein said region has a pair of end walls and an annular wall and means for diverting fluid adjacent at least one of said walls from said outlet passage.

10. The combination according to claim 9 wherein said last-mentioned means is located about said outlet passage.

11. The combination according to claim 9 wherein said diverter means comprises a body pervious to said fluid.

12. The combination according to claim 9 further comprising a chamber, said diverting means directing fluid adjacent one of said end walls to said chamber.

13. The combination according to claim 12 further comprising a fluid amplifier comprising a power orifice and a pair of opposed control orifices, means for supplying the fluid in said chamber to said power orifice and means for supplying fluid in said outlet passage to one of said pair of control orifices.

14. The combination according to claim 12 further comprising a fluid amplifier including a power orifice for issuing a stream of fluid, at least two outlet apertures positioned to receive said stream of fluid and means for deflecting said stream of fluid so as to vary the proportions of fluid flowing to said outlet apertures, means for supplying the fluid in said chamber to said power orifice and means for supplying fluid in said outlet passage of said region to said means for deflecting to deflect said stream of fluid as a function of the direction and rate of rotation of said fluid in said region of said region.

15. The combination according to claim 2 wherein said means for defining a region includes a pair of end walls and an annular wall disposed between said end walls, and means for controlling the static pressure in said region comprising contouring the interior surfaces of at least one of said end walls.

16. The combination according to claim 15 wherein both of said end walls are contoured and are mirror images of one another.

17. The combination according to claim 15 wherein said means for introducing fluid into said region is contoured so as to cause the fluid in said region to remain attached to said contoured end walls substantially throughout their radial length.

18. The combination according to claim 2 further comprising means for integrating the static pressures in said region over predetermined radial lengths of said chamber.

19. The combination according to claim 18 wherein said last mentioned means comprises further means for sensing the static pressures in said region at at least two specific locations therein.

20. The combination according to claim 18 wherein said last mentioned means includes means for sensing the static pressures over the entire areas of the inner surfaces of said end walls.

21. The combination according to claim 20 wherein said end walls are porous and a distinct chamber communicates with each of said end walls.

22. The combination according to claim 2 further comprising means for developing at least one normally radially directed stream of fluid extending through said region, said measuring means comprising a device for detecting displacement of said jet from its radial position.

23. A device for measuring both the rate of rotation and the angular displacement of an object about one of its axes of rotation, said device comprising means defining a region having included therein a generally circular cross-sectional area, the circular cross-sectional area having an axis which passes through the center of and is perpendicular to said area, said device being positioned such that said axis of said area has a projection on said axis of said object, means for introducing a first fluid into said region adjacent its outer circumferential periphery such that said fluid has substantially only a radial velocity in the absence of rotation of the object about its said axis, means for establishing at least one stream of fluid directed radially through said region towards its center in the absence of rotation of the body about said axis, at least one outlet passage substantially coaxial with said axis of said area, and sensing means for developing fluid pressure and flow in said outlet passage which are functions of the sense and degree of deflection of said stream from its initial radial path relative to said region and of the sense and rate of rotation of said first fluid in the vicinity of said outlet passage.

24. The combination according to claim 23 wherein there are at least two of said streams.

25. The combination according to claim 23 wherein there are at least four of said streams disposed at 90° relative to one another.

26. The combination according to claim 23 further comprising means for integrating the static pressures in said vortex chamber over predetermined radial lengths of said chamber.

27. A device for generating a signal which is a function of both the rate of rotation and angular displacement of an object about one of its axes, said device comprising a chamber having a circular cross-sectional area, said area having an axis passing through the center of and perpendicular to said area, said chamber being positioned such that said axis of said area has a component lying parallel to said axis of said object, means for introducing a first fluid into said chamber adjacent its outer circumferential periphery such that said fluid has substantially only a radial velocity in the absence of rotation of the object about its said axis, means for establishing at least one stream of fluid directed radially through said area towards its center in the absence of rotation of the body about its said axis, said stream of fluid having a high radial velocity relative to said first fluid, a pair of oppositely directed outlet passages coaxial with said axis of said area, and sensing means for developing fluid pressure and flow in said outlet passage which are functions of the sense and degree of deflection of said stream from its initial radial path relative to said region and of the sense and rate of rotation of said first fluid in the vicinity of said outlet passage.

References Cited by the Examiner

UNITED STATES PATENTS

| | | |
|---|---|---|
| 1,841,606 | 1/1932 | Kollsman. |
| 2,660,886 | 12/1953 | Milmore _____ 73—502 X |

RICHARD C. QUEISSER, *Primary Examiner.*

A. M. HORTAN, S. FEINBERG, *Examiners.*

L. L. HALLACHER, J. J. GILL, *Assistant Examiners.*